United States Patent
Farrell et al.

(10) Patent No.: US 9,948,783 B1
(45) Date of Patent: Apr. 17, 2018

(54) PUBLISHING CONTACTS TO OPT-IN USERS

(71) Applicant: Avaya Inc., Basking Ridge, NJ (US)

(72) Inventors: Gráinne Farrell, Galway (IE); Adrian Ryan, Galway (IE); Conor Tannian, Galway (IE); Will Meaney, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/461,526

(22) Filed: Mar. 17, 2017

(51) Int. Cl.
*H04M 3/523* (2006.01)
*H04M 3/51* (2006.01)
*H04L 29/08* (2006.01)

(52) U.S. Cl.
CPC .......... *H04M 3/5238* (2013.01); *H04L 67/22* (2013.01); *H04M 3/5183* (2013.01); *H04M 3/5191* (2013.01); *H04M 3/523* (2013.01); *H04M 3/5232* (2013.01)

(58) Field of Classification Search
CPC ............. H04M 3/5191; H04M 3/5183; H04M 3/5232; H04M 3/523; H04M 3/5238
See application file for complete search history.

(56) References Cited

U.S. PATENT DOCUMENTS

| | | | | |
|---|---|---|---|---|
| 9,197,479 B2* | 11/2015 | Altberg | ............. | H04L 29/06027 |
| 9,680,996 B2* | 6/2017 | Kumar | ................ | H04M 3/5191 |
| 2004/0143476 A1* | 7/2004 | Kapadia | ................. | G06Q 30/02 |
| | | | | 705/500 |
| 2006/0126818 A1* | 6/2006 | Berger | ................ | H04M 3/5191 |
| | | | | 379/265.09 |

OTHER PUBLICATIONS

Datasheet; "TeamQ"; http://www.avst.com/solutions/featured/collaboration/index.asp; 2017.

* cited by examiner

*Primary Examiner* — Nafiz E Hoque
(74) *Attorney, Agent, or Firm* — Stevens & Showalter, LLP

(57) ABSTRACT

A method for reducing backlog at a call center comprises receiving a request for an agent of a contact center from a device associated with a contact and determining a context for the request. Based on the context, the request may be published to a portal service while restricting agents from servicing the request, and the duration of time that the request is published is monitored. If an interrupt that indicates that an opt-in user would like to handle the published request is received, then a device associated with the opt-in user is communicably coupled to the device associated with the contact. However, if the time that the request is published surpasses a threshold and an interrupt is not received then the request is removed from being published to the portal service and agents of the contact center are allowed to service the request.

20 Claims, 4 Drawing Sheets

US 9,948,783 B1

PUBLISHING CONTACTS TO OPT-IN USERS

BACKGROUND

Various aspects of the present invention relate to the technological field of optimizing throughput at a contact center.

Contact centers are employed by many enterprises to service inbound and outbound telephonic calls, e-mails, chats, other communications, etc. from contacts (i.e., customers). A typical contact center includes a switch and/or server to receive and route incoming packet-switched and/or circuit-switched requests and one or more resources, such as human agents and automated resources (e.g., Interactive Voice Response (IVR) units), to service the incoming requests. Contact centers distribute calls, whether inbound or outbound, for servicing to any suitable resource according to certain predefined criteria.

BRIEF SUMMARY

According to aspects of the present invention, a method for reducing backlog at a call center comprises receiving a request for an agent of a contact center from a device associated with a contact and determining a context for the request. Based on the context, the request may be published to a portal service while restricting agents from servicing the request, and the duration of time that the request is published is monitored. If an interrupt that indicates that an opt-in user would like to handle the published request is received, then a device associated with the opt-in user is communicably coupled to the device associated with the contact. However, if the time that the request is published surpasses a threshold and an interrupt is not received then the request is removed from being published to the portal service and agents of the contact center are allowed to service the request.

DETAILED DESCRIPTION

According to various aspects of the present disclosure, an opt-in user may have access to requests for an agent of a contact center such that the opt-in user may service the request instead of an agent of the contact center. Because the opt-in user is not an agent of the contact center, the opt-in user is under no obligation to service any of the requests. However, the requests for service include a context that indicates why the request was issued by a contact. Therefore, the opt-in user may be enticed to service the request.

Thus, the opt-in user may offload the backlog at the contact center. Further, the opt-in user can have a higher chance that the contact associated with the request will include some business for the opt-in user instead of just helping offload random backlog. Moreover, the opt-in user may opt in whenever the business is slow for the opt-in user, making the opt-in user's time more efficient. Thus, interested parties (i.e., the opt-in user) who are not agents may dip in and out of the contact center to engage with contacts.

Figure 1:
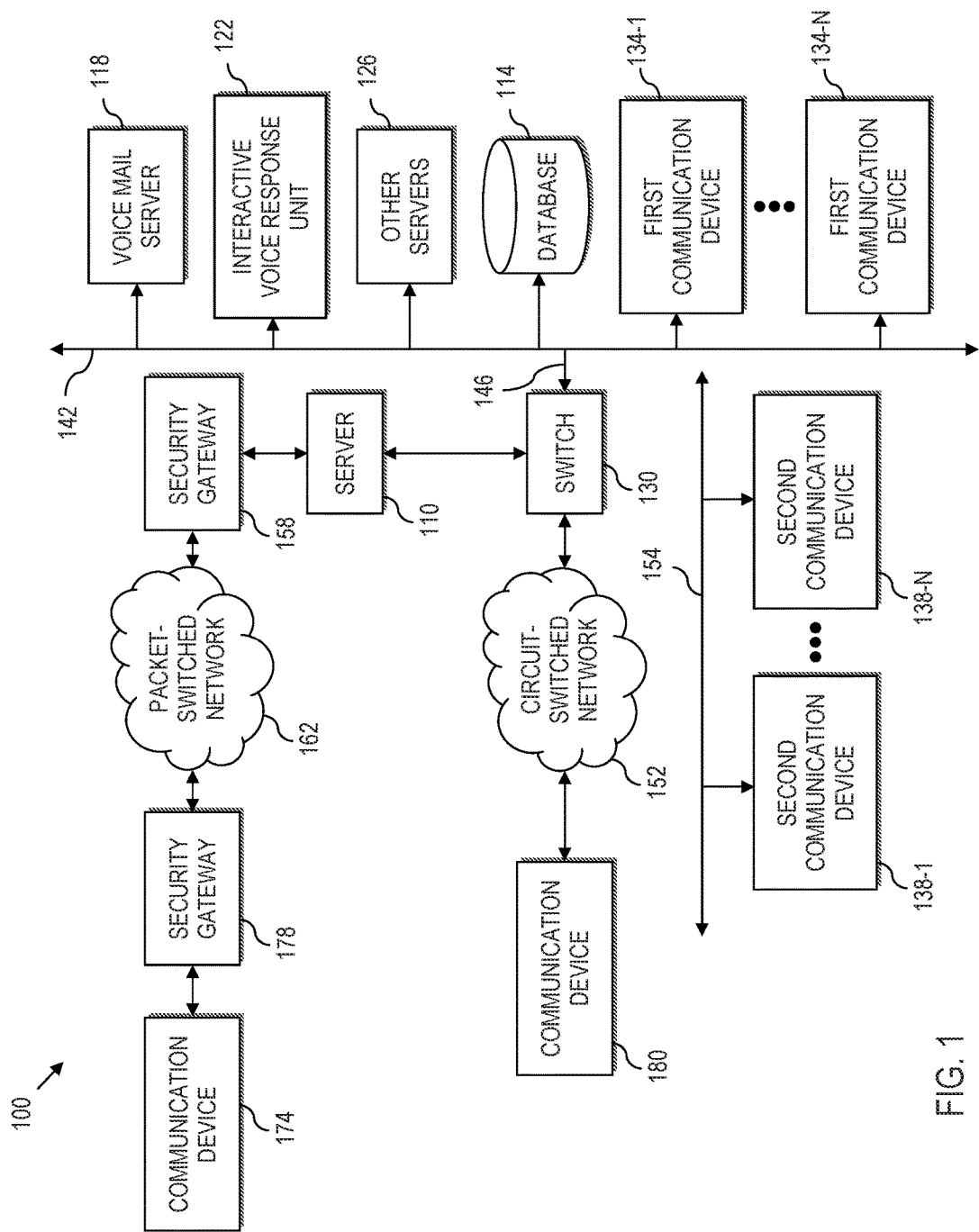
FIG. 1 is a block diagram illustrating a contact center, according to various aspects of the present disclosure.

Referring to drawings, FIG. 1 shows a block diagram of a contact center 100 that comprises a server 110; a set of data stores or database 114 containing contact or customer related information and other information that may enhance the value and efficiency of the contact processing; a plurality of servers (e.g., a voice mail server 118, an Interactive Voice Response unit (e.g., IVR) 122, and other servers 126); a switch 130; a plurality of working agents operating packet-switched (first) communication devices 134-1-N (such as computer work stations or personal computers); and/or circuit-switched (second) communication devices 138-1-M, which are interconnected by a Local Area Network (LAN) 142, or Wide Area Network (WAN). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. Further, the security gateway 158 may be implemented as hardware such as via an adjunct processor (as shown) or as a chip in the server.

Although systems herein are discussed with reference to client-server architecture, it is to be understood that the principles of the present invention apply to other network architectures. For example, aspects of the present disclosure may apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, packet- or circuit-switched networks are not required.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ PrivateBranch Exchange (PBX)-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™ IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch, server, or first and second communication devices (i.e., the invention may be implemented with any desired type of transport medium as well as combinations of different types of transport channels).

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178 and the circuit-switched network 152 with an external second communication device 180.

In a preferred configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

As will be appreciated, the server 110 is notified via the LAN 142 of an incoming contact by communications component (e.g., switch 130, fax server, email server, Web Server, and/or other servers) receiving the incoming contacts as shown in FIG. 1. The incoming contact is held by the receiving telecommunications component until the server 110 forwards instructions to the component to forward or route the contact to a specific contact center resource, such as the IVR unit 122, the voice mail server 118, and/or first or second communication device 134-1-N, 138-1-M associated with a selected agent. The server 110 distributes and connects these contacts to telecommunication devices of available agents based on the predetermined criteria noted above. When the server 110 forwards a contact to an agent, the server 110 also forwards customer-related information from the database 114 to the agent's computer work station for viewing (such as by a pop-up display) to permit the agent to better serve the customer of the contact center. Depending on the agent's profiles, their current working status, and parameters of the incoming contacts, the server 110 may assign a multichannel contact to the agents of the contact center. The agents process the incoming contacts sent to them by the server 110. This embodiment is particularly suited for a Customer Relationship Management (CRM) environment in which customers are permitted to use any media to contact an enterprise. In a CRM environment, both real-time and non-real-time contacts must be handled and distributed with equal efficiency and effectiveness.

Figure 2:
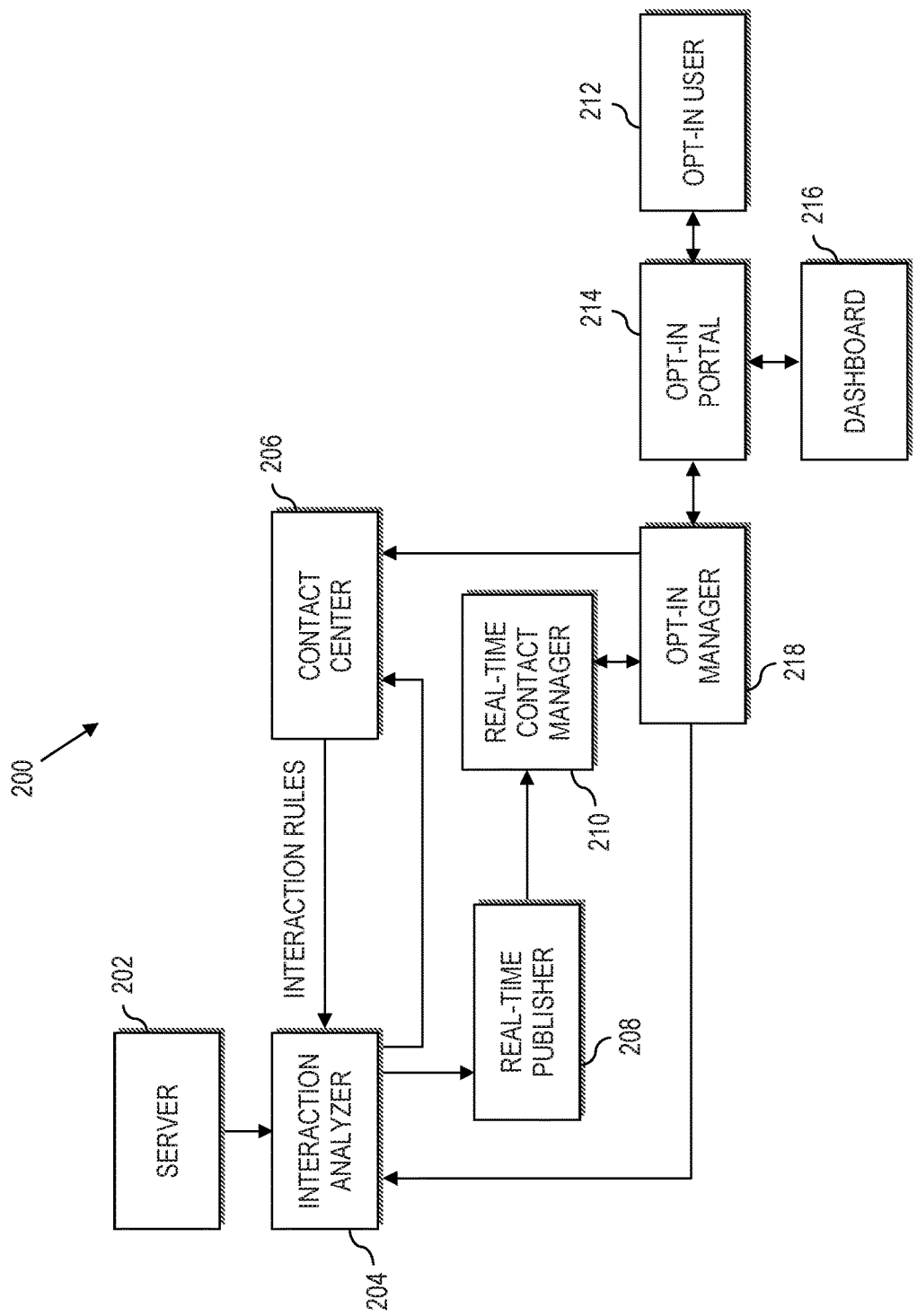
FIG. 2 is a block diagram illustrating a system for reducing backlog at a call center, according to various aspects of the present disclosure.

FIG. 2 illustrates a system 200 for reducing backlog at a contact center by allowing an opt-in user to service a request for an agent of the contact center. Basically, a contact (i.e., a customer) interacts with a server 202, which is monitored by an interaction analyzer 204. For example, the contact may browse a website on the server 202, and the interaction analyzer may keep track of an identity of the user, the webpages browsed (including the order in which they were browsed), etc. As another example, the contact may telephone a contact center 206 and reach a server where the contact is presented with choices for selection. Then, the interaction analyzer 204 monitors selections made by the contact in response to the choices presented. As shown, the server 202 is separate from the contact center 206, but in some embodiments, the server 202 is part of the contact center 206.

Rules for the interaction analyzer 204 may be determined by an administrator of the contact center 206 and may be used in real time by the interaction analyzer 204 to determine a context for any request for an agent that may be received from the contact. For example, a rule may be that if the contact center is operating with fewer agents than needed, then allow more requests to be serviced by opt-in users. The interaction rules are also explained in greater detail below.

Based on the context, the interaction analyzer 204 determines whether the request should be published such that an opt-in user may service the request instead of an agent of the contact center 206 servicing the request. If the interaction analyzer 204 determines that the request should be published, then the request is sent to a real-time publisher 208 so the request may be published to an opt-in portal service. Further, the real-time publisher 208 may publish any or all of the interaction rules to a real-time contact manager 210, which manages a queue of published requests such that an opt-in user may service any of the requests.

Further, an opt-in user (e.g., a person at an affiliate 212 of an enterprise associated with the contact center (e.g., a franchise, a subsidiary, a dealership, a local branch, etc.)), who is not an agent of the call center, may subscribe to an opt-in portal 214 to have access to requests published by the contact center 206. The opt-in portal 214 is coupled to a dashboard 216 such that the opt-in portal service (or the opt-in user) may build a custom dashboard to enable different real-time views of the published requests. For example, the request may be published with the context associated with the request. As another example, the dashboard may include how long a request has been published. Also, as shown there is only one opt-in portal 214 and one affiliate 212. However, there may be numerous opt-in portals 214 and numerous affiliates 212 that subscribe to one of the opt-in portals 214.

Moreover, the opt-in manager 218 may include profiles for all opt-in users who may subscribe or access the opt-in portal 214 on an ad-hoc basis. The profiles may include name, location, previous filter searches, etc.

Further, the opt-in portal 214 is coupled to an opt-in manager 218 that allows the opt-in user to filter the published requests to determine if the opt-in user should service one of the requests. Additionally, the opt-in manager 218 itself may perform some filtering before any of the opt-in users individually filter the queue of published requests. As such, there may be at least three levels of filtering: global filtering by the interaction analyzer 204, regional filtering by the opt-in manager 218, and individual filtering by the opt-in user.

If the opt-in user does decide to jump in and service a specific request, then any outcome of the request is sent to the contact center 206. For example, a transcript of the interaction between the contact and the opt-in user may be sent for storage in the contact center database. As another example, the outcome may be that the opt-in user had to transfer the contact to an agent of the contact center for more help. A further example of an outcome includes sending statistics about the interaction to the contact center to feed performance dashboards at the contact center.

However, if the request is not serviced by the opt-in user and the request is published for a time exceeding a threshold, then the request is removed from the opt-in portal and sent to the contact center to be serviced by an agent of the contact center, as discussed above in reference to FIG. 1.

The opt-in system 200 described above may be an all-in-one system or may be a collection of discrete systems. For example, as an all-in-one system, the contact center or enterprise associated with the contact center would have direct control over every element of the system. On the other hand, if the system is a collection of discrete systems, then the contact center may have control over a few elements (e.g., the interaction analyzer, the real-time publisher, etc.) and the enterprise or its affiliate may have control over other elements (e.g., opt-in portal 214, opt-in manager 218, etc.). Moreover, the elements may communicate with each other through exposed application programming interfaces (APIs) such that the system is event-driven between two or more elements.

Further, the opt-in system 200 described above allows for an opt-in user to service a request for an agent and provides several benefits over current systems that just route calls within a contact center (or several contact centers) by resource matching as described above. For example, the opt-in user may offload the backlog at the contact center. Further, the opt-in user can choose specific requests to service, which increases the chance that the contact associated with the request will include some business for the opt-in user, which gives incentive for the opt-in user to opt in. Moreover, the opt-in user may opt in whenever the business for the opt-in user is slow, making the opt-in user's time more efficient. Thus, interested parties (i.e., the opt-in user) who are not agents of the contact center may dip in and out of the contact center to engage with contacts.

Figure 3:
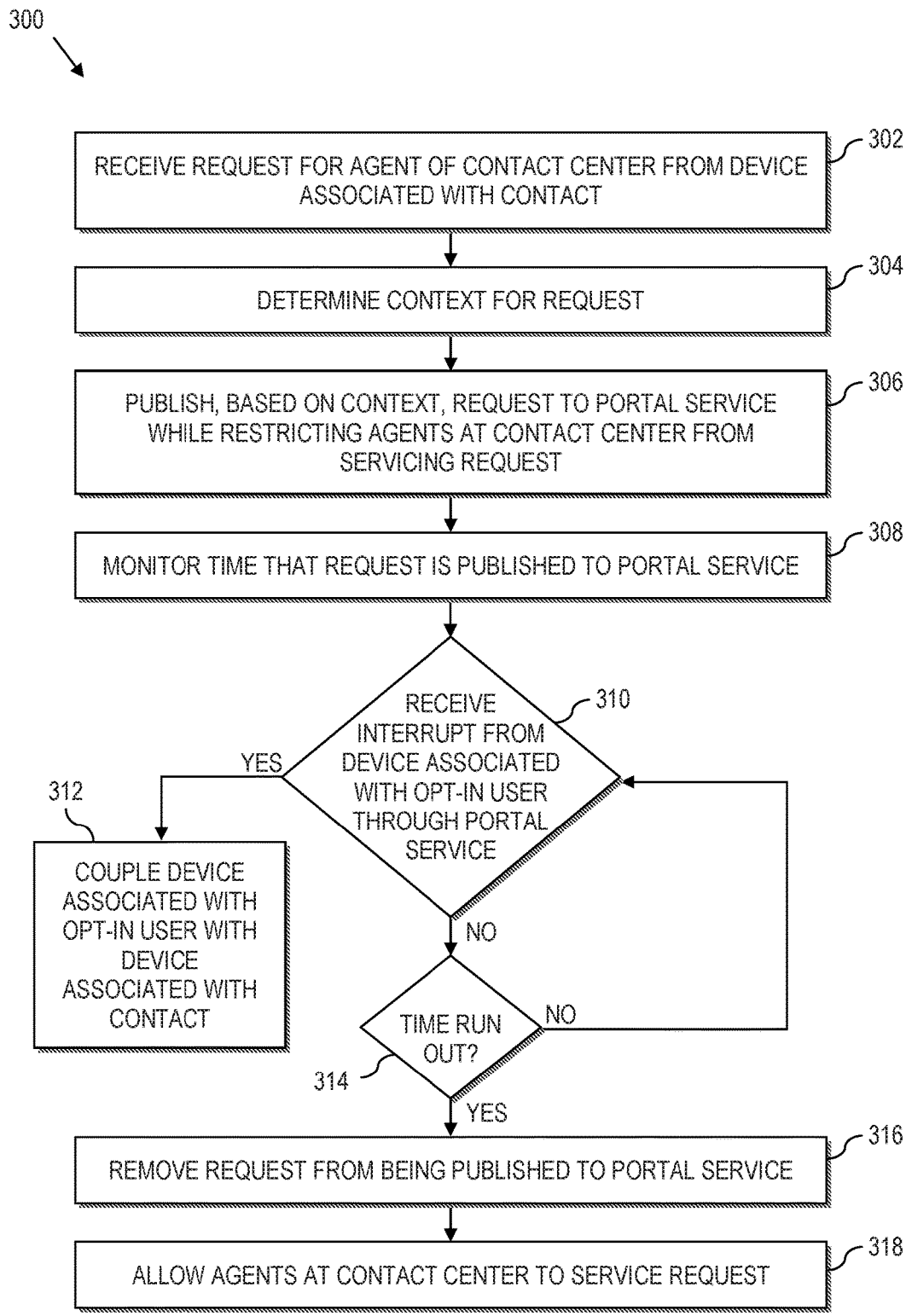
FIG. 3 is a flow chart illustrating a method for reducing backlog at a call center, according to various aspects of the present disclosure.

Referring now to FIG. 3, a method 300 for reducing backlog at a contact center is presented. In this regard, the method 300 may be implemented on computer-readable hardware that stores machine-executable program code, where the program code instructs a processor to implement the described method. The method 300 may also be executed by a processor coupled to memory, where the processor is programmed by program code stored in the memory, to perform the described method. While the boxes of the flowchart indicate an order, the method 300 may be performed in any order, with some of the boxes performed in parallel if desired.

At 302, a request for an agent of a contact center is received from a device associated with a contact. As noted above, there are several different ways that a contact may request help from an agent from a contact center. For example, if a contact is browsing through pages of an enterprise's website and decides that help is needed, then the contact may click on a "request agent" button on the enterprise's website. As another example, the request may be received by a contact calling, e-mailing, etc. the contact center.

At 304, a context for the request is determined. The context for the request may be determined using: a type of contact, services offered by the contact center, a type of interaction, an identity of the contact, a location of the contact, etc., or combinations thereof. For example, if the request comes in from a contact browsing a website, the context may include parameters such as a web-based contact, a browsing history of the contact before the request was received, a name of the contact, etc. As another example, if the request comes from a contact that calls into the contact center, the context may include parameters such as a phone contact, the contact's name, any subsequent or previous selections of choices presented to the contact before or after the request is received, etc. As such, the context may be anything associated with what the contact did surrounding the time the request was received.

Further, interaction rules may be applied to the context. For example, an administrator of the contact center may set up rules that help determine whether a request will be published (or continue to be published) to a portal service based on the context. For example, a rule may include that if all of the agents at the contact center are at a maximum capacity of contacts being handled, then received requests are published outside the contact center. Another example rule may be if a contact went to a certain webpage before submitting the request, then requests associated with that contact are published outside the contact center. Further, the rules may include that once a request is published outside the contact center, the request remains published outside the contact center for a maximum of two minutes. Moreover, the rules may include determining what services are requested and comparing that to the services offered by the contact center and/or agents' specialties at the contact center. Another example of a rule includes determining whether backlog at the contact center exceeds a threshold.

At 306, based on the context and the interaction rules, the request may be published to a portal service while restricting agents at the contact center from servicing the request. Thus, the request (along with the context information associated with the request) may be sent to a queue for an opt-in user to access. The queue is not a first-in first-out type queue, but instead allows an opt-in user to access any request in the queue as long as the request is published in the queue. Further, while a request is published in the queue associated with the portal service, agents of the contact center may not service the request. In some embodiments, while the request is published in the queue associated with the portal service, the agents of the contact center may not see the request at all. However, in other embodiments, the agents of the contact center may see the request, but the request may have an indication that the agent may not service the request at the present time.

In some embodiments, there is one overall queue associated with a portal service where all of the requests to be published to the portal service are published in the overall queue. However, in other embodiments, there are several queues associated with a portal service, and the interaction rules provide a pre-filtering that decides to which queue to publish the request. For example, if a portal service for an auto dealership has a queue for service and another queue for sales, then based on the context (e.g., did the contact indicate that the request was for sales or service), the received request may be pre-filtered to be published in one of those queues.

At 308, a duration of time that the request is published to the portal service is monitored.

At 310, a determination is made whether an interrupt is received from a device associated with an opt-in user. An opt-in user is a person who is not an agent of the contact center who may log into the portal service (or perpetually subscribe to the portal service through an app) and service a request published in the queue associated with the portal service. However, the opt-in user may be affiliated with an enterprise that is serviced by the contact center. For example, if an enterprise associated with the contact center is an automobile manufacturer, then the opt-in user may be an employee of a dealership that sells automobiles manufactured by the automobile manufacturer.

The opt-in user may use filters via an opt-in manager to filter the requests in the queue to determine if there is a request that the opt-in user wants to service. For example, the opt-in manager may include a place for the opt-in user to enter filter criteria (e.g., contact name, contact location, business associated with the contact, webpages visited by the contact, selection of choices made by the contact, etc., or combinations thereof) that can be compared to the context information to narrow the requests presented to the opt-in user.

In some cases, the opt-in user may use the opt-in manager to set up an alert that indicates when a request is published to the portal service that matches certain criteria. For example, the opt-in user may set an alert for a request where the contact is looking for a car over $30,000 in southwest Ohio. Subsequently, if a request whose context matches those criteria is published, then an e-mail or text message is sent to the opt-in user to alert the opt-in user that such a request has been received.

A dashboard (which may be individualized to a specific opt-in user) may display results of the filtering, other aspects of the queue, other metrics, etc. Thus, the opt-in user may select one of the presented requests to service.

When the opt-in user selects a request from the queue, an interrupt is sent from a device associated with the opt-in user. At 312, the device associated with the opt-in user is coupled to the device associated with the contact. For example, if the request is received from a contact browsing a web site, then a chat window may appear on the device associated with the contact, where the contact and the opt-in user may chat. When the opt-in user and the contact complete their interaction, an outcome of the interaction is reported to the contact center. Thus, the request is serviced by the opt-in user, who is not an agent of the call center.

However, if at 314 no interrupt is received (i.e., no opt-in user has selected the request) and if the time that the request is published to the portal service surpasses a threshold, then at 316, the request is removed from being published on the queue associated with the portal service and at 318 allowing agents at the contact center to service the request. For example, if a request is to be published on the service portal for two minutes and after two minutes passes and no opt-in user services the request, then the request is removed from the service portal and assigned to an agent or placed in a queue such that agents of the contact center may select the request for servicing.

A non-limiting example is provided to illustrate use of the method 300. In the example, the contact center is associated with an automobile manufacturer, and an administrator at the contact center has set up interaction rules including: a two-minute publish time, only publish if the contact center includes a backlog of ten percent, monitor a browsing history of contacts as the contacts are on the automobile manufacturer's website, and determine a location of the contact.

An opt-in user is employed as a salesman at a dealership in Cleveland, Ohio that sells vehicles manufactured by the automobile manufacturer and has set up an alert for contacts that are looking for any vehicle by the manufacturer in a forty-mile radius of the dealership. Further, the dealership is running a contest among the employees to see if any of them can sell a blue sedan before the end of the month. As such, the opt-in user uses the filters, dashboard, and alert system to set up an alert for contacts looking for a vehicle similar to the blue sedan within a seventy-mile radius.

A contact from a suburb of Cleveland browses a website associated with the automobile manufacturer and seems to only be selecting red sedans, no matter the model. The contact selects a link to view a standard warranty and spends about three minutes on the warranty page. Then, the contact hits a "back" button and selects a "request chat session with an agent" button on the website.

The server receives the request for the agent (302, FIG. 3) and applies the interaction rules to determine a context for the request (304, FIG. 3). In this example, the context includes that the contact is located in a suburb of Cleveland, is looking for sedans (most likely red sedans), and viewed the warranty. The contact center is currently operating with a fifteen percent backlog, so the request is published outside the contact center to a portal service such that the agents of the contact center may not service the request (306, FIG. 3) and a timer starts (308, FIG. 3).

The request matches one of the alerts set up by the opt-in user (i.e., contacts that are looking for any vehicle by the manufacturer in a forty-mile radius of the dealership), so a text message is sent to a device of the opt-in user. The opt-in user logs into the portal service and the request matching the alert is presented to the opt-in user via the dashboard. Moreover, the context that is associated with the request is also displayed. As such, the opt-in user decides to service the request (310, FIG. 3), and a chat window is opened between the contact and the opt-in user (312, FIG. 3). A transcript of the chat between the contact and the opt-in user along with metadata (e.g., opt-in user's name and location, contact's name and location, when the chat started, duration of the chat, etc.) is sent to the contact center for storage in a database.

After servicing the contact, the opt-in user determines that business is rather slow at the dealership at the present time, so the opt-in user decides to look at further requests that are published by removing the filters placed earlier. While there are several requests published, none of the published requests pique the opt-in user's interest (e.g., one of the contacts is located in Denver, Colo.; one of the published requests is for service instead of sales, etc.), so the opt-in user chooses not to service any of the remaining published requests. When the time runs out on any of the published requests (because no opt-in users at other dealerships select the request for servicing), the request is removed from being published (316, FIG. 3) and is sent to the queue of an agent at the contact center (318, FIG. 3).

The preceding example is a non-limiting example, and the methods and systems described herein are not limited to automobile manufacturing websites. As discussed above, the systems and methods may be applied to a contact center associated with any enterprise including a distributed workforce separate from the call center.

Figure 4:
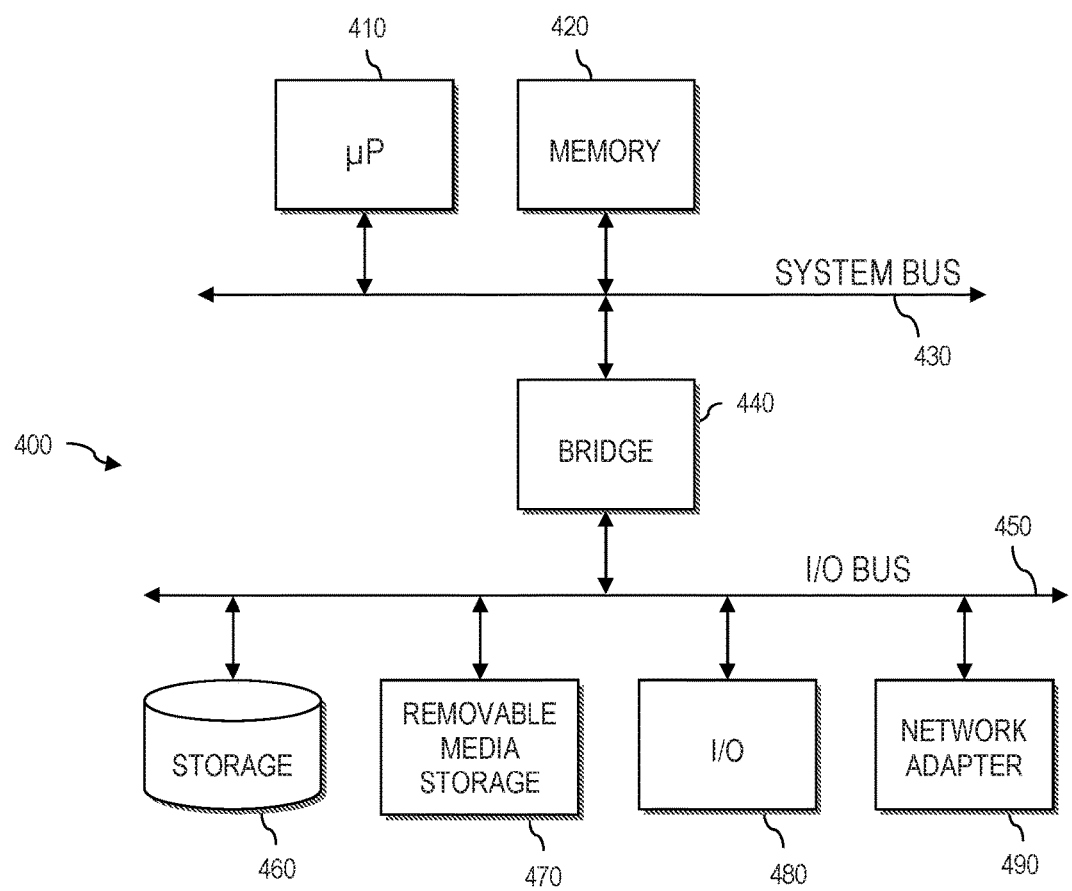
FIG. 4 is a block diagram of a computer system having a computer readable storage medium for implementing functions according to various aspects of the present invention as described in greater detail herein.

Referring to FIG. 4, a block diagram of a data processing system is depicted in accordance with the present invention. Data processing system 400 may comprise a symmetric multiprocessor (SMP) system or other configuration including a plurality of processors 410 connected to system bus 420. Alternatively, a single processor 410 may be employed. Also connected to system bus 420 is local memory 430. An I/O bus bridge 440 is connected to the system bus 420 and provides an interface to an I/O bus 450. The I/O bus may be utilized to support one or more buses and corresponding devices 470, such as storage 460, removable media storage 470, input/output devices (I/O devices) 480, network adapters 490, etc. Network adapters may also be coupled to the system to enable the data processing system to become coupled to other data processing systems or remote printers or storage devices through intervening private or public networks.

Also connected to the I/O bus may be devices such as a graphics adapter, storage and a computer usable storage medium having computer usable program code embodied thereon. The computer usable program code may be executed to implement any aspect of the present invention, for example, to implement any aspect of any of the methods and/or system components illustrated in FIGS. 1-3.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using a Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A method for reducing backlog at a call center, the method comprising:
   receiving a request for an agent of a contact center from a device associated with a contact;
   determining a context for the request;
   publishing, based on the context, the request to a portal service while restricting agents at the contact center from servicing the request;
   monitoring a time that the request is published to the portal service;
   receiving an interrupt from a device associated with an opt-in user, wherein the interrupt indicates that the opt-in user would like to handle the published request;
   performing if the interrupt is received:
      coupling, communicably, the device associated with the opt-in user to the device associated with the contact after; and
   performing if the time that the request is published to the portal service surpasses a threshold and an interrupt from a device associated with an opt-in user is not received:
      removing the request from being published to the portal service; and
      allowing agents at the contact center to service the request.

2. The method of claim 1, wherein performing if the interrupt is received further comprises:
   reporting, to the contact center, an outcome of an interaction between the contact and the opt-in user.

3. The method of claim 1, wherein publishing, based on the context, the request to a portal service while restricting agents at the contact center from servicing the request comprises publishing, based on the context, the request to a portal service while restricting agents at the contact center from servicing the request only if a backlog of the call center surpasses a threshold.

4. The method of claim 1, wherein determining a context for the request further comprises determining a context for the request based on an identity of the contact.

5. The method of claim 1, wherein determining a context for the request further comprises determining a context for the request based on a type of request.

6. The method of claim 1, wherein determining a context for the request further comprises determining a context for the request based on an identification of the contact's actions before the contact issued the request.

7. The method of claim 6, wherein determining a context for the request based on an identification of the contact's actions before the contact issued the request comprises:
   determining that the request is from a contact on a web site;
   determining a browsing history of the contact while the contact was on the web site; and
   determining the context based on the browsing history of the contact.

8. The method of claim 6, wherein determining a context for the request based on an identification of the contact's actions before the contact issued the request comprises:
   determining that the request is from a contact on a phone system;
   presenting the contact with choices regarding the request;
   receiving a selection from the contact based on the choices presented to the contact; and
   determining the context based on the selection based on the choices presented to the contact received from the contact.

9. The method of claim 1 further comprising:
   receiving, from the device associated with the opt-in user, settings for a filter that filters published requests based on the contexts of the published requests; and
   sending a notification to the device associated with the opt-in user that a request meeting the filter settings is available.

10. The method of claim 1 further comprising:
   receiving, from the device associated with the opt-in user, settings for a filter that filters published requests based on the contexts of the published requests; and
   ordering the published requests based on the filter settings.

11. Computer-readable hardware with a program for reducing backlog at a call center stored thereon, wherein the computer program instructs a processor to perform:
   receiving a request for an agent of a contact center from a device associated with a contact;
   determining a context for the request;
   publishing, based on the context, the request to a portal service while restricting agents at the contact center from servicing the request;
   monitoring a time that the request is published to the portal service;
   receiving an interrupt from a device associated with an opt-in user, wherein the interrupt indicates that the opt-in user would like to handle the published request;
   performing if the interrupt is received:

coupling, communicably, the device associated with the opt-in user to the device associated with the contact after; and performing if the time that the request is published to the portal service surpasses a threshold and an interrupt from a device associated with an opt-in user is not received:

removing the request from being published to the portal service; and allowing agents at the contact center to service the request.

12. The computer-readable hardware of claim 11, wherein performing if the interrupt is received further comprises:

reporting, to the contact center, an outcome of an interaction between the contact and the opt-in user.

13. The computer-readable hardware of claim 11, wherein publishing, based on the context, the request to a portal service without publishing the request to a contact center comprises publishing, based on the context, the request to a portal service without publishing the request to a contact center only if a backlog of the call center surpasses a threshold.

14. The computer-readable hardware of claim 11, wherein determining a context for the request further comprises determining a context for the request based on an identity of the contact.

15. The computer-readable hardware of claim 11, wherein determining a context for the request further comprises determining a context for the request based on a type of request.

16. The computer-readable hardware of claim 11, wherein determining a context for the request further comprises determining a context for the request based on an identification of the contact's actions before the contact issued the request.

17. The computer-readable hardware of claim 16, wherein determining a context for the request based on an identification of the contact's actions before the contact issued the request comprises:

determining that the request is from a contact on a web site;

determining a browsing history of the contact while the contact was on the web site; and determining the context based on the browsing history of the contact.

18. The computer-readable hardware of claim 16, wherein determining a context for the request based on an identification of the contact's actions before the contact issued the request comprises:

determining that the request is from a contact on a phone system;

presenting the contact with choices regarding the request;

receiving a selection from the contact based on the choices presented to the contact; and determining the context based on the selection based on the choices presented to the contact received from the contact.

19. The computer-readable hardware of claim 11, wherein the program further instructs the processor to perform:

receiving, from the device associated with the opt-in user, settings for a filter that filters published requests based on the contexts of the published requests; and sending a notification to the device associated with the opt-in user that a request meeting the filter settings is available.

20. The computer-readable hardware of claim 11, wherein the program further instructs the processor to perform:

receiving, from the device associated with the opt-in user, settings for a filter that filters published requests based on the contexts of the published requests; and ordering the published requests based on the filter settings.

* * * * *

UNITED STATES PATENT AND TRADEMARK OFFICE
CERTIFICATE OF CORRECTION

PATENT NO. : 9,948,783 B1
APPLICATION NO. : 15/461526
DATED : April 17, 2018
INVENTOR(S) : Farrell et al.

Page 1 of 1

It is certified that error appears in the above-identified patent and that said Letters Patent is hereby corrected as shown below:

In the Claims

Column 11, Line 57, "contact after; and" should read --contact; and--

Column 13, Line 3, "contact after; and" should read --contact; and--

Signed and Sealed this
Sixth Day of November, 2018

Andrei Iancu
*Director of the United States Patent and Trademark Office*